(12) United States Patent
Wagner

(10) Patent No.: US 6,427,973 B1
(45) Date of Patent: Aug. 6, 2002

(54) VACUUM SYSTEM WITH A VACUUM PLATE VALVE

(75) Inventor: Rudolf Wagner, Fontnas (CH)

(73) Assignee: Unaxis Trading AG, Truebbach (CH)

( * ) Notice: Subject to any disclaimer, the term of this patent is extended or adjusted under 35 U.S.C. 154(b) by 0 days.

(21) Appl. No.: 09/632,847

(22) Filed: Aug. 4, 2000

Related U.S. Application Data

(63) Continuation of application No. PCT/CH99/00036, filed on Jan. 27, 1999.

(30) Foreign Application Priority Data

Feb. 4, 1998 (CH) ............................................... 273/98

(51) Int. Cl.⁷ ............................................... F16K 25/00
(52) U.S. Cl. ........................ 251/175; 251/187; 251/193
(58) Field of Search ................................. 251/175, 187, 251/193, 326

(56) References Cited

U.S. PATENT DOCUMENTS

| | | | | |
|---|---|---|---|---|
| 2,091,671 A | * | 8/1937 | Campbell et al. | 251/187 X |
| 2,582,877 A | * | 1/1952 | Makler | 251/175 |
| 2,819,034 A | * | 1/1958 | Holderer | 251/175 X |
| 2,825,528 A | * | 3/1958 | Truitt | 251/187 X |
| 3,241,807 A | * | 3/1966 | Holderer | 251/158 |
| 3,343,562 A | * | 9/1967 | Combes | 251/187 X |
| 3,524,467 A | * | 8/1970 | Worley | 251/175 X |
| 3,576,198 A | * | 4/1971 | Bessot | 251/175 X |
| 3,999,522 A | * | 12/1976 | Jaulmes | 251/193 X |
| 4,157,169 A | * | 6/1979 | Norman | 251/187 X |
| 4,238,111 A | * | 12/1980 | Norman | 251/197 X |
| 4,470,576 A | * | 9/1984 | Schertler | 251/193 X |
| 4,718,637 A | * | 1/1988 | Contin | 251/158 |
| 4,776,564 A | * | 10/1988 | Westenberg | 251/175 |
| 5,087,017 A | * | 2/1992 | Sawa et al. | 251/175 |
| 5,120,019 A | * | 6/1992 | Davis, Jr. | 251/193 |
| 5,228,468 A | * | 7/1993 | Kapadia | 137/1 |
| 5,641,149 A | * | 6/1997 | Ito | 251/187 X |
| 5,975,492 A | * | 11/1999 | Brenes | 251/193 X |
| 6,056,266 A | * | 5/2000 | Blecha | 251/193 X |

* cited by examiner

*Primary Examiner*—William C. Doerrler
*Assistant Examiner*—John Bastianelli
(74) *Attorney, Agent, or Firm*—Crowell & Moring, LLP

(57) ABSTRACT

A vacuum arrangement with a vacuum disc valve. A support plate is movably guided along a wall with an opening that is closed or opened by a valve. A seal plate is provided on the support plate which is controlled and actuated through a cylinder chamber. When the support plate is moved, the seal plate is displaced in the direction of the opening and is tightly placed on the borders of said opening by actuation in the cylinder chamber. The resulting sealing forces are absorbed by the movement guides of the support plate.

31 Claims, 2 Drawing Sheets

VACUUM SYSTEM WITH A VACUUM PLATE VALVE

BACKGROUND AND SUMMARY OF THE INVENTION

This application is a Continuation Application of PCT application number PCT/CH99/00036, filed Jan. 27, 1999.

This application claims the priority of 273/98, filed in Switzerland on Feb. 4, 1998, the disclosure of which is expressly incorporated by reference herein.

The present invention relates to a vacuum system with a vacuum plate valve.

Plate valves are valves in which a valve plate is driven transversely in the plane of one or more ports to be closed, and into or across the latter, and then the plate is sealed to the periphery of the port or around all of the ports.

Of course, a great variety of valves for the controlled, tight closing of ports are known, not all of them efficient, much less all of them plate valves. For example, European Patent Document, EP-A-0 590 964 (corresponding to U.S. Pat. No. 5,356,113) discloses a valve by means of which the flow from one port in an actual valve housing to a second is controlled. The valve comprises a first plate and, a parallel second plate attached by a flexible bellows. By applying pressure to the interior of the bellows the two plates are pushed apart and both are brought into sealing contact each with a margin of a port. Since the plates are not displaceable parallel to the plane of the ports, this is not a plate valve.

WO93/18322 discloses a plate valve for blast furnace air heating apparatus, which is contained in its own valve housing. Its purpose is to connect or separate from one another the ports of two coaxial pipe connections on the valve housing. For this purpose a valve plate is provided which is disposed between the pipe connections and is driven linearly parallel to the planes of the ports of the pipe connections. Hydraulic lifting devices are mounted on the wall of the valve housing, by means of which the entire valve plate is urged against the margin of one of the pipe connections lying within the housing, thus closing the pipe connection.

A similar system is shown by LU-57991. In a valve housing a valve plate is mounted and driven for linear movement over a pipe connection and it is inserted between the pipe connections and withdrawn from them again. Expandable bellows are provided on a support plate, on both sides, which are closed in each case by sealing plates. To seal off the passage through the pipe connection, the support plate with the bellows and sealing plates is pushed out of the housing and between the pipe connections, and then by a common, simultaneous expansion of the bellows, both sealing plates are urged against the ends of the pipe connection. As in EP-0 590 964, the sealing forces compensate one another by simultaneous, oppositely directed sealing. On the other hand, according to WO93/18322, the necessary sealing force is absorbed by the valve housing wall with the operating devices.

A very similar procedure is shown in NL-7604483, according to which the connection between two pipe connections is produced by the insertion of a valve plate, oppositely directed build-up of sealing pressure forms a bilateral seal at sealing pistons that is self-compensating with regard to sealing forces.

An object of the present invention to provide an arrangement for a vacuum system with a vacuum plate valve, in which the valve is to control at least one port in a wall, that is, the passage from one space on one side of the wall into a space on the other side of the wall, these spaces communicating through the port in the wall. Intervention into the connection passing through the wall and forming the port, which might possibly be interpreted as a "tubular connection," is not to take place. With the present invention such a system is furthermore to be created in which no actual valve housing is necessary. Also, the design of the system is to be flexibly extendable such that a plurality of vacuum chamber ports or wall ports can be controlled independently of one another, i.e., simultaneously or staggered in time, by a single plate valve, and in which—especially in the case of a plurality of ports—the number of ports per closing movement is minimized. Furthermore, the valve is to be operable in both directions with a sealing pressure difference, and is also to be usable in vacuum processes on both sides.

This object is achieved according to preferred embodiments by providing a vacuum system, with a wall, at least one port in the wall and a vacuum plate valve operable to control fluid flow through the at least one part said valve comprising:

a supporting plate mounted for movement parallel to the wall, the movement path of which runs across the port;

at least one sealing plate mounted on the plate surface facing the wall for movement perpendicular to the plate surface and parallel with respect to the latter;

a sealed, expandable operating cylinder chamber between the supporting plate and the at least one sealing plate;

a pressure-medium line carried through or on the supporting plate, leading into the cylinder chamber; and movement guides for supporting the plate with respect to the wall, said guides withstanding the sealing force thrusting back onto the sealing plate during operation.

Only on one side is one or more sealingly expandable operating cylinder chambers provided on the supporting plate, each with a sealing plate, so that by the movement of the supporting plate—a positioning movement—the one or more sealing plates are brought in alignment onto the corresponding number of ports provided in the wall. Thereafter, by applying pressure to the cylinder chambers, the sealing plates provided—at least one—are pressed sealingly against the margins of the particular ports. The resultant unilateral sealing thrust is absorbed by the means for guiding the supporting plate movement. A gaseous medium—preferably air—is used as the pressure medium for the at least one provided cylinder chamber.

It is thereby possible to move the valve plate as a whole directly along the wall containing the at least one port, until a sealing plate is positioned in each case opposite the port in the wall that is to be sealed. The minimum necessary sealing movement is limited downwardly only by the releasing movement that is necessary in order to displace the valve plate, with the sealing plate disengaged, freely along the wall. This releasing movement can be very small, but therefore the necessary sealing movement of the sealing plate or plates can also be small.

In a preferred embodiment the cylinder chamber is encapsulated, preferably in a bellows, or defined by a rubber-elastic wall. This is accomplished preferably by means of a metal bellows, a bellows with metallic and/or rubber-elastic wall part of the capsule, e.g., an air-tight rubber-elastic "bubble" in a stabilizing telescopic housing.

The rim of the port and/or the sealing plate comprises on its side facing away from the support plate, preferably at least one sealing element deforming elastically under sealing pressure, which can be formed by at least one rubber-elastic sealing element and/or by at least one metallic sealing element of appropriate dimensions.

Furthermore, the sealing plate is preferably mounted on the supporting plate with guidance of its movement, preferably in the cylinder chamber (vacuum contamination!), preferably by means of guiding rods in the cylinder chamber, preferably with clearance. It is furthermore biased against the supporting plate by returning means, e.g., by spring members. Guidance with free play promotes a tight contact, independent of tolerances, of the sealing plate against a port. Preferably, furthermore, all of the operating, guiding and biasing means etc. for the sealing plate are also encapsulated in the cylinder chamber. This assures a bilateral usefulness of the valve for vacuum processes, while preventing particle contamination of such process spaces.

In order further to assure the complete uncovering of the port in the chamber wall it is proposed that at least one opening be provided in the supporting plate, spaced apart from the sealing plate, with a size and shape the same as or larger than any port to be sealed.

Thus, it can be seen that, following the concept of the invention, only the supporting plate can be moved, preferably linearly, along a wall containing the at least one port to be controlled, to a first position in which the said port is sealingly closed by the operation of the sealing plate, and to a second one in which the said port in the chamber wall is completely released by the said opening in the supporting plate.

In order to control a plurality of ports in a wall of a vacuum chamber system it is further proposed that, alternately, on the supporting plate according to the invention, on the one hand at least two of the said sealing plates be provided each with cylinder chambers and compressed air lines, and on the other hand, the above-mentioned releasing openings, while preferably and basically more than one cylinder chamber can be operated in common by a central pressure-medium line on or in the supporting plate.

Furthermore, movement guides are preferably formed as groove-and-wheel guides acting on the supporting plate as sealing force back supports.

In that case the sealing forces being back-supported can be very high—precisely in the case of a plurality of ports to be sealed. Furthermore, the guides assure the valve function regardless of the direction in which a pressure difference— e.g., atmospheric pressure accordingly—acts on the valve plate.

Also, the sealing surface area of the sealing plate on the port margin is preferably smaller than the sealing plate surface area to which pressure is applied by the cylinder chamber, preferably no more than half as large. Thus it is possible to work with a relatively low sealing pressure of the medium and nevertheless the valve can be closed even by overcoming appreciable counter-pressures. Furthermore, this also permits extremely economical operation as regards the pressure medium, as well as a gentle, controlled establishment and release of the seal. The latter, again, substantially improves the useful life of such valves in regard to their survival of sealing cycles without maintenance.

Also from the viewpoint of avoiding the formation of particles, a "gentle," low-impact operation is most advantageous.

Furthermore, a preferably encapsulated, preferably bellows-sealed operating system is provided for the relative displacement of the supporting plate with respect to the wall—the positioning movement—by which the pressure medium line is brought to the valve plate, again preferably.

The described drive system is mounted directly in the area of the wall, on the wall itself, for example, on the valve side or directly on the outside of the wall.

On the wall and/or sealing plate side additional sealing means, such as an O-ring for example, can be provided around the port or ports.

The valve provided according to the invention can separate vacuum atmospheres which must be kept pure, especially if their positioning drive is also encapsulated. Especially when a plurality of ports are to be controlled by a valve plate provided according to the invention, there is only a long-stroke opening and closing movement—the positioning movement—in which the supporting plate is displaced as a whole along or over the ports. Providing this single common supporting plate eliminates the need for providing specific valve housings associated in each case with the ports.

If the plate valve is designed for controlling a plurality of ports, sealing plates with associated operating means can be individually removed and replaced, resulting in easier maintenance. Since preferably the pressure surfaces controlled by the cylinder chambers are made substantially greater than the sealing surfaces to be sealed to the chamber wall openings, it is possible among other things to operate with low medium pressures and accordingly low consumption of the medium.

By bringing the medium line centrally to the valve plate, especially one designed for the control of a plurality of ports, there is only one lead through the vacuum chamber wall which is preferably used at the same time for the positioning drive of the plate valve. The proposed expandable cylinder chambers, preferably with short sealing strokes, assures minimal particle production by the sealing plate movement.

Also, especially in the case of a design for the control of a plurality of ports, since no continuous sealing surface of large area is provided for all ports but each of the ports is sealed by an associated sealing plate, there are no longer any machining and tolerance problems with large-area sealing surfaces: The individual sealing plates seal to a great extent independently of machining and tolerances. Gaskets that are provided can be examined and replaced if necessary through the chamber openings without removing the valve plate. Especially when employed for a plurality of openings, the result is a compact and easily maintained valve design.

The system according to the invention is suitable especially for use in parallel processing and batch apparatus, especially in apparatus of the kind described in Swiss Patent document CH-A-687 986, where a plurality of process chambers in a vacuum chamber system can be controlled as a stack through slots stacked one over the other.

Other objects, advantages and novel features of the present invention will become apparent from the following detailed description of the invention when considered in conjunction with the accompanying drawings.

DETAILED DESCRIPTION OF THE DRAWINGS

Figure 1:
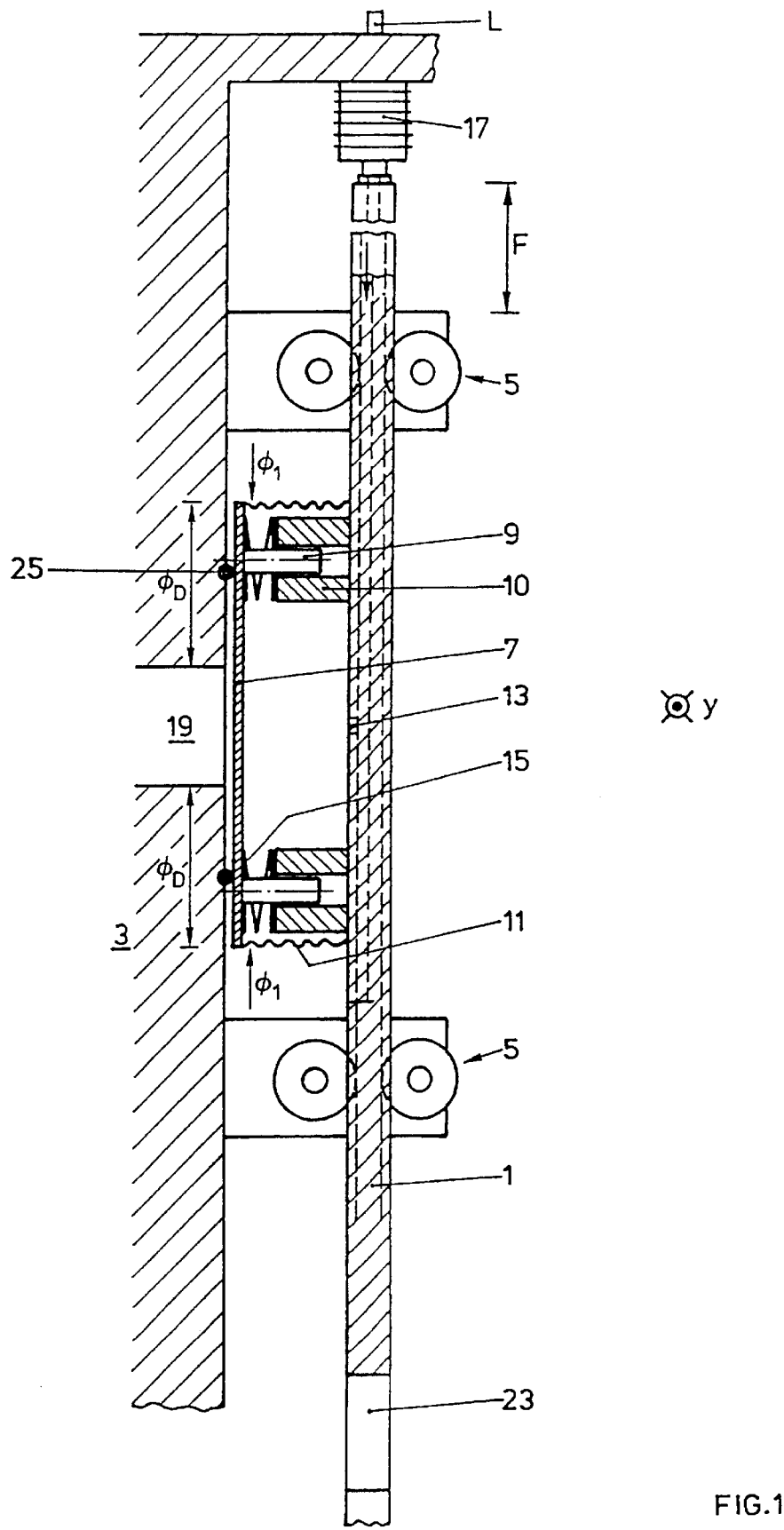
FIG. 1 is a schematic, longitudinal sectional view of a vacuum chamber system and a valve assembly constructed according to a preferred embodiment of the invention.

The system of the invention comprises a plate valve with, according to FIG. 1, a supporting plate 1 which is preferably displaceable laterally, preferably linearly, along the wall 3 of a vacuum chamber system, preferably in lateral wheel guides 5. The supporting plate 1 bears on its one side, depending on the design, one or more sealing plates 7 which are guided for movement perpendicular to the length of the supporting plate on guiding pins 9 which slide on bushings 10 attached to the supporting plate 1, preferably with clearance. Between supporting plate 1 and the sealing plate or plates 7, a sealed, expandable cylinder chamber 11 is provided, as represented in the form of a bellows chamber or formed by a rubber-elastic bubble. The cylinder chamber 11 is operated by a line 13 in the supporting plate 1, carrying a pressure medium. Return devices, e.g., tension springs 15, draw the sealing plate 7 back to its off position when the cylinder chamber 11 is not activated. The cylinder chamber 11 comprises all parts in frictional contact, especially the guides and return devices. At least one elastic sealing member 25 can be provided on one of the wall side 3 and the sealing plate 7.

The supporting plate 1 running in the guiding means, especially wheel guides 5, is driven by a plunger, preferably encapsulated in a bellows 17, in the driving direction F, and through it the compressed-air line 13 is also passed at the center of plate 1. The pressure area $\phi_1$ is preferably selected so as to be substantially greater than the sealing surface area $\phi_D$ acting between sealing plate 7 and the port margin; preferably the area $\phi_1$ is greater than the sealing surface area $\phi_D$ by a factor of 2.

In the plate 1, downward in the direction F of the sealing plate system there is provided a release opening 23 and, in case of a plurality of sealing plate systems, openings 23 are provided between each. By relieving the pressure in the cylinder chamber 11 and slightly raising the sealing plate 7, followed by a linear displacement in direction F, the port 19, previously sealingly closed in the chamber system wall, is completely opened by aligning opening 23 with the said port 19.

In a preferred manner, the valve plate of the invention is installed vertically. If the vacuum atmosphere on one side of the port 19 is more sensitive to contamination than on the other, the valve plate is installed on the less contamination-sensitive side. The resultant sealing pressure on the supporting plate 1 is in that case absorbed by the guides, especially wheel guides 5.

The valve plate shown is especially suitable for the control of port slots 19 running lengthwise in direction y in FIG. 1, so that narrow sealing disks 7 flexibly conforming to the port margins can be used.

As shown in FIG. 1, the positioning drive 17 for the positioning movement of the supporting plate 1 is mounted directly in the area of the wall 3. Preferentially, this drive comprises an encapsulated piston-cylinder arrangement (at 17). In this arrangement only the necessary pressure medium—such as air—is brought in from the outside through the line connections L. As shown, the entire valve system extends only indirectly along the wall 3 with the ports 19 to be controlled, and the entire sealing force of the unilaterally acting plate valve is absorbed on the guides 5.

Figure 2:
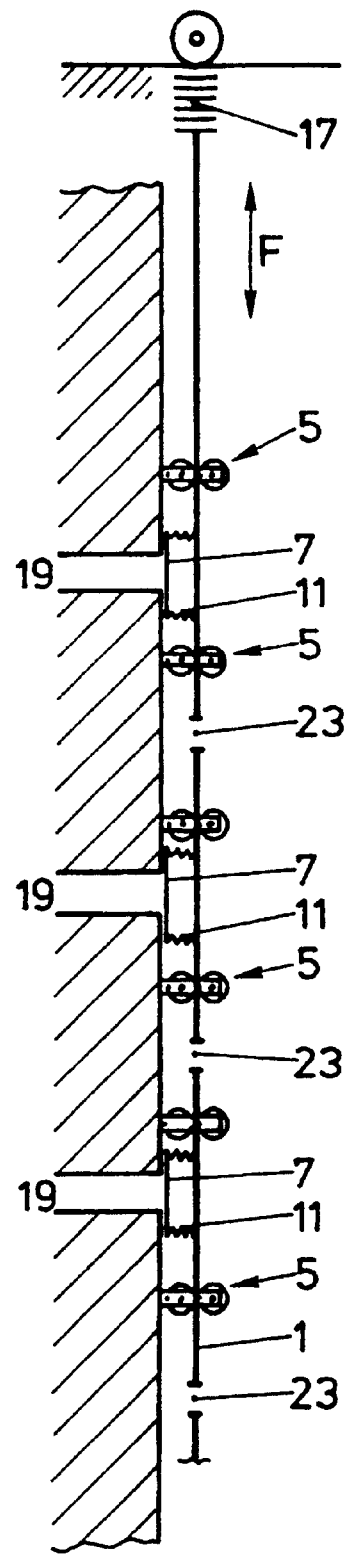
FIG. 2 is a schematic view depicting the operating principle of a multiple valve plate according to the invention.

A system for controlling a plurality of ports is represented schematically in FIG. 2. The same reference numbers as in FIG. 1 are used for the same parts. After the explanation of FIG. 1 no further explanations are necessary.

When used in a batch system, especially one of the kind described in CH-A-687 986, corresponding to U.S. Pat. No. 5,551,986, regarding which the said document is declared to be an integral component of the present description, the result is a highly compact, simple construction of the entire system, especially if one considers that to date it was customary in these systems to seal all of the process chamber stacked ports in common with one plate, i.e., to seal around all ports. In that case an extremely long releasing movement of the plate was necessary.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Vacuum system with a wall, at least one port in the wall and a vacuum plate valve operable to control fluid flow through the at least one port, said valve comprising:

a supporting plate movable parallel to said wall, the movement path of said supporting plate running across said at least one port;

at least one sealing plate mounted on said supporting plate and facing said wall, said sealing plate being movable perpendicular to said supporting plate towards and away from said wall;

at least one fluid-expandable drive chamber operatively arranged between said supporting plate and said at least one sealing plate to drivingly move said sealing plate towards and away from said wall and thereby away from and towards said supporting plate upon supply of fluid from the outside to the drive chamber through said supporting plate and release of the fluid, respectively; and movement guide members supporting said supporting plate with respect to said wall;

said sealing plate being movable into alignment with said at least one port by way of said movement guide members and being movable towards said at least one port by said fluid-expandable drive chamber so as to sealingly close said at least one port, whereby said supporting plate is supported by said movement guide members such that reaction forces acting on said supporting plate when said sealing plate sealingly closes said at least one port are absorbed by said guide members.

2. The vacuum system of claim 1, wherein said supporting plate is drivingly movable parallel to said wall.

3. The vacuum system of claim 1, wherein said supporting plate is movable adjacent to said wall.

4. The vacuum system of claim 1, wherein said supporting plate is linearly movable along said wall.

5. The vacuum system of claim 1, wherein said sealing plate overlaps said at least one port all around said port when said sealing plate is in alignment with said port and said fluid-expandable drive chamber is operationally arranged with said sealing plate along a fluid-pressurable surface which is larger than a surface with which said sealing plate overlaps said at least one port.

6. The vacuum system of claim 5, wherein said fluid-pressurable surface is at least twice said surface with which said sealing plate overlaps said at least one port.

7. The vacuum system of claim 5, wherein at least one sealing member is provided on the wall or the sealing plate.

8. The vacuum system of claim 7, wherein said sealing member is an elastic member.

9. The vacuum system of claim 8, wherein said elastic member is formed by an O-ring.

10. The vacuum system of claim 1, wherein said movement guide members comprise members rigidly mounted to said wall.

11. The vacuum system of claim 10, wherein said movement guide members comprise roller and groove guide members.

12. The vacuum system of claim 1, further comprising more than one of said ports staggered along said wall along the direction of movement of said supporting plate.

13. The vacuum system of claim 1, wherein said port is slit-shaped with a longitudinal axis of said slit running transversely to the direction of movement of said supporting plate.

14. The vacuum system of claim 1, further comprising more than one of said ports, said ports being slit-shaped with a longitudinal axis of said slit running transversely to the direction of movement of said supporting plate.

15. The vacuum system of claim 14, wherein said ports have an equal shape.

16. The vacuum system of claim 15, further comprising vacuum process chambers arranged vertically and each communicating with one of said ports.

17. The vacuum system of claim 1, wherein said fluid-expandable drive chamber comprises at least one guiding pin operating in a fluid-expanable cylinder chamber.

18. The vacuum system of claim 1, wherein said drive chamber is encapsulated.

19. The vacuum system of claim 18, wherein said drive chamber is encapsulated by way of at least one bellows.

20. The vacuum system of claim 19, wherein said at least one bellows is of a metallic or an elastic material.

21. The vacuum system of claim 1, wherein said drive chamber is encapsulated by means of an elastic material wall.

22. The vacuum system of claim 1, wherein said sealing plate is guided perpendicularly to said supporting plate.

23. The vacuum system of claim 22, wherein said sealing plate is guided with respect to said supporting plate by a pin and bushing arrangement.

24. The vacuum system of claim 1, wherein said sealing plate is guided by way of a guide pin with respect to said supporting plate.

25. The vacuum system of claim 1, wherein said sealing plate is guided with respect to said supporting plate with a predetermined clearance.

26. The vacuum system of claim 1, wherein said sealing plate is biased towards said supporting plate.

27. The vacuum system of claim 1, said supporting plate comprising at least one opening substantially shaped according to said at least one port, said opening being alignable with said at least one port by said supporting plate.

28. The vacuum system of claim 1, further comprising more than one of said ports staggered in the direction of movement of said supporting plate, said more than one ports having a predetermined mutual distance and wherein more than one of said sealing plates are provided on said supporting plate staggered with said distance.

29. The vacuum system of claim 28, wherein said supporting plate comprises openings between said sealing plates.

30. The vacuum system of claim 29, wherein the distance of said openings equals said mutual distance between said ports.

31. A vacuum plate valve arrangement comprising:

a supporting plate adjacent to a wall having at least one port, said supporting plate being movable along said wall and across said at least one port;

at least one sealing plate mounted on said supporting plate and facing said wall, said sealing plate being movable perpendicular to said supporting plate towards and away from said wall;

at least one fluid-expandable drive chamber operatively arranged between said supporting plate and said at least one sealing plate to drivingly move said sealing plate towards and away from said wall and thereby away from and towards said supporting plate upon supply of fluid from the outside to the drive chamber through said supporting plate and release of the fluid, respectively, to thereby sealingly close and open said at least one port; and movement guide members supporting said supporting plate with respect to said wall;

wherein a surface of said supporting plate opposite said sealing plate is exposed to ambient.

* * * * *